United States Patent [19]

Jahnke

[11] 3,892,720

[45] July 1, 1975

[54] POLYMERIZABLE HYDROXY-CONTAINING ESTERS OF AMIDO-SUBSTITUTED SULFONIC ACIDS

[75] Inventor: Richard William Jahnke, Mentor-on-the-Lake, Ohio

[73] Assignee: The Lubrizol Corporation, Cleveland, Ohio

[22] Filed: Jan. 14, 1974

[21] Appl. No.: 433,321

Related U.S. Application Data

[62] Division of Ser. No. 375,257, June 29, 1973, abandoned.

[52] U.S. Cl.... 260/79.5 C; 260/79.3 MU; 260/79.5 R; 260/456 A
[51] Int. Cl. .............................................. C08f 3/92
[58] Field of Search... 260/79.5 R, 79.5 C, 79.3 MU

[56] References Cited
UNITED STATES PATENTS

| | | | |
|---|---|---|---|
| 2,983,712 | 5/1961 | Wilkinson | 260/79.3 MU |
| 3,332,904 | 7/1967 | La Combe et al. | 260/79.3 MU |
| 3,506,707 | 4/1970 | Miller et al. | 260/79.3 MU |
| 3,531,442 | 9/1970 | Miller et al. | 260/79.3 MU |
| 3,536,721 | 10/1970 | Soong et al. | 260/79.3 MU |
| 3,692,673 | 9/1972 | Hoke | 260/79.3 MU |

Primary Examiner—Ronald W. Griffin
Attorney, Agent, or Firm—James W. Adams, Jr.; William H. Pittman

[57] ABSTRACT

Polymerizable amido-substituted sulfonic acids, especially 2-acrylamido-2-methylpropanesulfonic acid, react with epoxides (especially ethylene and propylene oxide) to form hydroxy-containing esters which are useful for the production of dyeable and dyeability-improving polymers.

12 Claims, No Drawings

POLYMERIZABLE HYDROXY-CONTAINING ESTERS OF AMIDO-SUBSTITUTED SULFONIC ACIDS

This is a division of application Ser. No. 375,257 filed June 29, 1973, now abandoned.

This invention relates to new compositions of matter and methods for their preparation. More particularly, it relates to compounds and mixtures of compounds of the formula

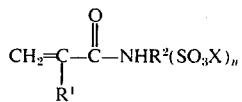

wherein: $R^1$ is hydrogen, halogen or a lower alkyl or substituted lower alkyl radical;

$R^2$ is a divalent or trivalent hydrocarbon or substituted hydrocarbon radical;

each X is individually hydrogen or

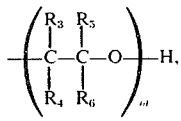

at least one X being other than hydrogen;

each of $R^3$, $R^4$, $R^5$ and $R^6$ is hydrogen or a hydrocarbon or substituted hydrocarbon radical, at least one of $R^3$, $R^4$, $R^5$ and $R^6$ being hydrogen;

$m$ is an integer from 1 to 10, and $n$ is 1 or 2.

The term "hydrocarbon radical" as used herein includes aliphatic, cycloaliphatic and aromatic (including aliphatic- and cycloaliphatic-substituted aromatic and aromatic-substituted aliphatic and cycloaliphatic) radicals. It also includes cyclic radicals wherein the ring is completed through another portion of the molecule; that is, any two indicated substituents may together form a cycloalkyl radical.

The following are illustrative of monovalent hydrocarbon radicals within the scope of this invention. The corresponding divalent or trivalent radicals are derived therefrom by abstraction of one or two hydrogen atoms. Where a named radical has several isomeric forms (e.g., butyl), all such forms are included.

| | |
|---|---|
| Methyl | Benzyl |
| Ethyl | Cyclohexyl |
| Propyl | Cyclopentyl |
| Butyl | Methylcyclopentyl |
| Hexyl | Cyclopentadienyl |
| Octyl | Vinylphenyl |
| Decyl | Isopropenylphenyl |
| Vinyl | Cinnamyl |
| Allyl | Naphthyl |
| Ethynyl | |
| Propargyl | |
| Phenyl | |
| Tolyl | |
| Xylyl | |
| —$C_6H_3(C_2H_5)_2$ | |
| —$C_6H_4(CH_2)_{11}CH_3$ | |

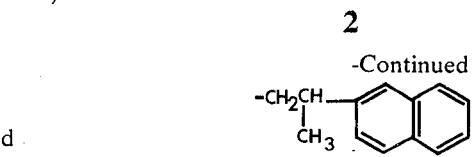

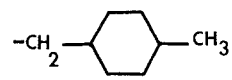

Many obvious variations of these radicals will be apparent to those skilled in the art and are included within the scope of the invention.

Substituted hydrocarbon, alkyl, aryl, etc., radicals are considered fully equivalent to the hydrocarbon, alkyl, aryl, etc., radicals and to be part of this invention. By "substituted" is meant radicals containing substituents which do not alter significantly the character or reactivity of the radical. Examples are:

Hydroxy
Ether (especially lower alkoxy)
Keto
Aldehydo
Ester (especially lower carbalkoxy)
Aminoacyl (amide)
Amino
Nitro
Cyano
Thioether
Sulfoxy
Sulfone
Sulfonic acid (and derivatives thereof)

In general, no more than about three such substituent groups will be present for each 10 carbon atoms in the radical.

Usually, the hydrocarbon or substituted hydrocarbon radicals in the compounds of this invention are free from ethylenic and acetylenic unsaturation and have no more than about 30 carbon atoms, desirably no more than about 12 carbon atoms. A preference is expressed for lower hydrocarbon radicals, the word "lower" denoting radicals containing up to seven carbon atoms. Still more preferably, they are lower alkyl or aryl radicals, most often alkyl.

As previously indicated, $R^1$ in the compounds of this invention may be hydrogen, halogen or a lower alkyl or substituted lower alkyl radical. Most often it is hydrogen or lower alkyl and especially hydrogen or methyl, usually hydrogen. $R^2$ may be any divalent (usually) or trivalent hydrocarbon or substituted hydrocarbon radical, preferably lower alkylene or arylene and especially lower alkylene. In a preferred embodiment of the invention, $R^2$ is

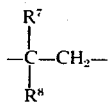

wherein $R^7$ is hydrogen or a lower alkyl radical, $R^8$ is a lower alkyl radical and the sulfur atom is attached to the unsubstituted methylene carbon.

It will be apparent that when $R^2$ is an alkylene or arylene radical, as preferred, n will be 1. In that event, the compounds of this invention are hydroxyalkyl or alkyleneoxyalkyl esters of the corresponding sulfonic acids. When $R^2$ is a trivalent radical and n is 2, the compounds of this invention include both the mono- and diesters of the corresponding disulfonic acids, as well as mixtures of monoesters and diesters.

Each of the $R^{3-6}$ radicals is hydrogen or a hydrocarbon or substituted hydrocarbon radical, and at least one and preferably at least two of said radicals is hydrogen. Usually, three of the $R^{3-6}$ radicals are hydrogen and the fourth is hydrogen or a lower alkyl radical (preferably methyl).

The compounds of this invention are conveniently prepared by reacting an acrylamido sulfonic acid of the formula

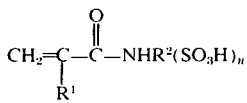

with an epoxide of the formula

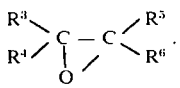

In procedures of this type, the epoxide usually reacts as though it were a dimer or higher polymer. Thus, in most of the compounds of this invention m will be 2 or greater, and the invention includes mixtures of compounds in which $n$ is 2 and greater than 2, up to 10, as well as compounds in which $m$ is 1.

The reaction between the acrylamidoalkanesulfonic acid and the epoxide is conveniently carried out by merely mixing the two reagents, usually at a temperature of about 0°–50°C. It is ordinarily preferred to use an excess of the epoxide, generally at least a 2:1 and frequently as high as a 25:1 excess (equivalents). The excess epoxide may serve as a diluent for the reaction, but other inert diluents such as aromatic hydrocarbons, aliphatic hydrocarbons, ethers and the like may be used. It is usually preferred that the reaction temperature not substantially exceed, for any prolonged period, the boiling point of the epoxide, many of which are low boiling compounds, since otherwise there may be considerable loss of epoxide. It is often advantageous to add a small amount of a polymerization inhibitor to the reaction mixture, either before or during the reaction, in order to avoid free radical polymerization under the conditions of the reaction.

When the reaction is complete, the compounds or mixtures of compounds of this invention may be recovered by conventional recovery techniques. It is frequently necessary only to remove the excess epoxide and/or diluent by evaporation or the like, since the product of this invention can frequently be used without purification.

The preparation of the compounds of this invention is illustrated by the following examples.

EXAMPLE 1

A three-necked round-bottomed flask, equipped with a stirrer and a Dry Ice-acetone condenser, is cooled to 0°C. and 531 parts (12.06 moles) of ethylene oxide is charged thereto, followed by 125 parts (0.6 mole) of 2-acrylamido-2-methylpropanesulfonic acid and 0.125 part of hydroquinone monomethyl ether. The mixture is stirred under reflux (about 12°C.) for about 3 hours. The excess ethylene oxide is then removed by vacuum stripping, yielding the desired ester. From the amount of ethylene oxide recovered, it appears that an average product molecule contains 1.83 ethylene oxide units.

EXAMPLE 2

A flask similar to that used in Example 1, but equipped with a water-cooled condenser, is cooled to below 20°C. and charged with 1740 parts (30 moles) of propylene oxide, 310.5 parts (1.5 moles) of 2-acrylamido-2-methyl-propanesulfonic acid, and 0.31 part of hydroquinone monomethyl ether. The mixture is heated under reflux (35°–36°C.), with stirring, for about 1¼ hours, and the excess propylene oxide is then removed by vacuum stripping. The residual liquid is the desired ester. From the amount of propylene oxide removed, it appears that an average molecule of the product contains 2.0 propylene oxide units.

EXAMPLE 3

2-Acrylamido-2-methylpropanesulfonic acid, 103.5 grams (0.5 mole), is added at 21°C. to a mixture of 88 grams (1.5 moles) of propylene oxide, 20 ml. of di-t-butylcresol and 250 ml. of benzene. The mixture is stirred for 2 hours, during which time the temperature rises to 32°C. Unreacted sulfonic acid is removed by filtration and volatiles are stripped under vacuum from the filtrate. The residue is the desired ester.

EXAMPLE 4

Following the procedure of Example 2, propylene oxide is reacted with 2-methacrylamido-2-methylpropanesulfonic acid to produce a similar ester.

EXAMPLE 5

Following the procedure of Example 2, 2-acrylamido-2-phenylpropanesulfonic acid is reacted with propylene oxide to produce a similar ester.

EXAMPLE 6

Following the procedure of Example 2, propylene oxide is reacted with 4-acrylamidobenzenesulfonic acid to produce a similar ester.

The compounds of this invention may be polymerized under free-radical conditions, either along or in the presence of other monomers. The term "polymer," as used herein, includes addition homopolymers, copolymers, terpolymers and other interpolymers.

Polymerization by the free-radical method may be effected in bulk, solution, suspension or emulsion, by contacting the monomer or monomers with a polymerization initiator either in the absence or presence of a diluent at a temperature of about 0°–200°C. Suitable initiators include benzoyl peroxide, tertiary butyl hydroperoxide, acetyl peroxide, hydrogen peroxide, azobisisobutyronitrile, persulfate-bisulfite, persulfate-sodium formaldehyde sulfoxylate, chlorate-sulfite and the like.

A large variety of polymerizable compounds can be used to form interpolymers with the compounds of this invention. They include (1) unsaturated monohydric alcohols and esters thereof, (2) unsaturated acids and esters thereof, (3) unsaturated polyhydric alcohols and esters thereof, (4) vinyl cyclic compounds, (5) unsaturated ethers, (6) unsaturated ketones, (7) unsaturated amides, (8) unsaturated aliphatic hydrocarbons, (9) unsaturated alkyl halides, (10) unsaturated acid anhydrides, (11) unsaturated acid chlorides, and (12) unsaturated nitriles. Specific illustrations of such compounds are:

1. Unsaturated alcohols and esters thereof: Allyl, methallyl, crotyl, 1-chloroallyl, 2-chloroallyl, cinnamyl, vinyl, methylvinyl, 1-phenallyl, butenyl alcohols, and esters of such alcohols with saturated acids such as acetic, propionic, butyric, valeric, caproic and stearic; with unsaturated acids such as acrylic, alphasubstituted acrylic (including alkylacrylic, e.g., methacrylic, ethylacrylic, propylacrylic, etc., and arylacrylic such as phenylacrylic), crotonic, oleic, linoleic and linolenic; with polybasic acids such as oxalic, malonic, succinic, glutaric, adipic, pimelic, suberic, azelaic and sebacic; with unsaturated polybasic acids such as maleic, fumaric, citraconic, mesaconic, itaconic, methylenemalonic, acetylenedicarboxylic and aconitic; and with aromatic acids, e.g., benzoic, phenylacetic, phthalic, terephthalic and benzoylphthalic acids.

2. Unsaturated acids (examples of which appear above) and esters thereof with saturated alcohols, such as methyl, ethyl, propyl, isopropyl, butyl, isobutyl, sec-butyl, tert-butyl, 2-ethylhexyl, cyclohexyl or behenyl alcohols.

3. Unsaturated polyhydric alcohols, e.g., butenediol, and esters thereof with saturated and unsaturated aliphatic and aromatic, monobasic and polybasic acids, examples of which appear above.

4. Vinyl cyclic compounds including styrene, o-, m-, p-chlorostyrenes, bromostyrenes, fluorostyrenes, methylstyrenes, ethylstyrenes and cyanostyrenes; di-, tri-, and tetra-chlorostyrenes, bromostyrenes, fluorostyrenes, methylstyrenes, ethylstyrenes, cyanostyrenes; vinylnaphthalene, vinylcyclohexane, divinylbenzene, trivinylbenzene, allylbenzene, and heterocycles such as vinylfuran, vinylpyridine, vinylbenzofuran, N-vinylcarbazole, N-vinylpyrrolidone and N-vinyloxazolidone.

5. Unsaturated ethers such as methyl vinyl ether, ethyl vinyl ether, cyclohexyl vinyl ether, octyl vinyl ether, diallyl ether, ethyl methallyl ether and allyl ethyl ether.

6. Unsaturated ketones, e.g., methyl vinyl ketone and ethyl vinyl ketone.

7. Unsaturated amides, such as acrylamide, methacrylamide, N-methylacrylamide, N-phenylacrylamide, N-allylacrylamide, N-methylolacrylamide, N-allylcaprolactam, diacetone acrylamide, hydroxymethylated diacetone acrylamide and 2-acrylamido-2-methylpropanesulfonic acid.

8. Unsaturated aliphatic hydrocarbons, for instance, ethylene, propylene, butenes, butadiene, isoprene, 2-chlorobutadiene and alpha-olefins in general.

9. Unsaturated alkyl halides, e.g., vinyl fluoride, vinyl chloride, vinyl bromide, vinylidene chloride, vinylidene bromide, allyl chloride and allyl bromide.

10. Unsaturated acid anhydrides, e.g., maleic, citraconic, itaconic, cis-4-cyclohexene-1,2-dicarboxylic and bicyclo(2,2,1)-5-heptene-2,3-dicarboxylic anhydrides.

11. Unsaturated acid halides such as cinnamoyl, acrylyl, methacrylyl, crotonyl, oleyl and fumaryl chlorides or bromides.

12. Unsaturated nitriles, e.g., acrylonitrile, methacrylonitrile and other substituted acrylonitriles.

The especially preferred polymers are the copolymers with acrylic monomers; that is, with acids such as acrylic and methacrylic acids and their esters, amides and nitriles. Copolymers with acrylonitrile are especially useful, as described hereinafter.

The preparation of polymers of this invention is illustrated by the following examples.

EXAMPLE 7

To a solution of 264 grams of 2-acrylamido-2-methylpropanesulfonic acid and 0.02 gram of hydroquinone monomethyl ether in 500 grams of t-butyl alcohol is added with stirring, over 20 minutes at a temperature below 50°C., 135 grams of ethylene oxide. The mixture is stirred overnight and then an additional 30 grams of ethylene oxide is added and stirring is continued until the mixture is homogeneous. It is filtered and the residue is washed with additional t-butyl alcohol. The total volume is 1,000 ml.

A solution of 375 grams of acrylonitrile in 2,500 grams of t-butyl alcohol is purged with nitrogen and heated to 50°C., and there are added 200 ml. of the above-described solution and 5 grams of 4-t-butylcyclohexyl peroxydicarbonate. The mixture is stirred and after about 1½ hours, an additional 2.5 grams of the peroxydicarbonate is added. Stirring is continued for an additional 3½ hours, after which the polymer which precipitated is removed by filtration, washed with t-butyl and isopropyl alcohols and dried in vacuum.

EXAMPLE 8

Following the procedure of Example 7, 240 grams of 2-acrylamido-2-methylpropanesulfonic acid is reacted with 135 grams of propylene oxide in t-butyl alcohol solution, to obtain an ester solution with a total volume of 950 ml. Acrylonitrile, 375 grams, is then reacted with 150 ml. of this solution to obtain the desired copolymer which is isolated as in Example 7.

EXAMPLE 9

A 4.4-gram portion of a reaction product of ethylene oxide with 2-acrylamido-2-methylpropanesulfonic acid, similar to that described in Example 1, is diluted with 2.4 ml. of 0.1 N sulfuric acid and further diluted with water to 100 ml. A reaction flask, fitted with a stirrer, thermometer, nitrogen inlet tube and four addition funnels, is charged with 0.8 ml. of a 0.1 N sulfuric acid solution and 100 ml. of water, and the above-described product solution is added over 1⅓ hours, simultaneously with 100 grams of acrylonitrile, a solution of 1.5 grams of potassium persulfate in 100 ml. of water, and a solution of 0.75 gram of sodium metabisulfite in 100 ml. of water. After the addition of the reagents is complete, the mixture is stirred at 50°C. for 15 minutes and cooled to room temperature. The mixture is poured into a large excess of water and the precipitated polymer is removed by filtration, washed with water and dried at 60° C. in vacuum. The polymer absorbs 54 percent of its weight of Sevron Blue 2G basic dye.

EXAMPLE 10

Following the procedure of Example 9, a copolymer which absorbs 65.8 percent of its weight of Sevron Blue 2G dye is prepared from 100 grams of acrylonitrile, 10 grams of a reaction product of propylene oxide with 2-acrylamido-2-methylpropanesulfonic acid similar to that of Example 3, 0.75 gram of potassium persulfate and 2.2 grams of sodium metabisulfite.

The polymers of this invention, illustrated by those of Examples 9 and 10, can be drawn into fibers having improved affinity for basic dyes as compared with fibers of polymers not containing the monomeric compounds of this invention. Other polymers of this invention, such as those of Examples 7 and 8, may be blended with fiber-forming polymers such as polyacrylonitrile to form dyeable polymeric compositions, by methods similar to the one disclosed in U.S. Pat. No. 2,527,863. In general, the dyeable polymer composition will contain up to about 10 percent by weight of the polymer of this invention.

I claim:

1. An addition polymer of a compound or mixture of compounds of the formula

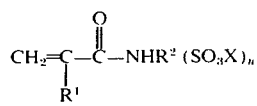

wherein: $R^1$ is hydrogen, halogen or a lower alkyl or substituted lower alkyl radical;

$R^2$ is a divalent or trivalent hydrocarbon or substituted hydrocarbon radical;

each "X" is individually hydrogen or

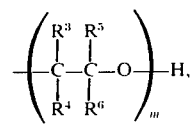

at least one X being other than hydrogen;

each of $R_3$, $R^4$, $R^5$ and $R^6$ is hydrogen or a hydrocarbon or substituted hydrocarbon radical, at least one of $R^3$, $R^4$, $R^5$ and $R^6$ being hydrogen;

$m$ is an integer from 1 to 10, and $n$ is 1 or 2;

wherein the substituents on said substituted radicals do not alter significantly their character or reactivity.

2. A polymer according to claim 1 wherein $R^1$ is hydrogen or a lower alkyl radical, $R^2$ is a lower alkylene radical, at least two of $R^3$, $R^4$, $R^5$ and $R^6$ are hydrogen, and $n$ is 1.

3. A polymer according to claim 2 wherein $R^1$ is hydrogen or methyl, $R_2$ is

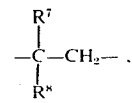

one of $R^3$, $R^4$, $R^5$, and $R^6$ is hydrogen or methyl and the other three are hydrogen, $R^7$ is hydrogen or a lower alkyl radical, $R^8$ is a lower alkyl radical, and the sulfur atom is attached to the unsubstituted methylene carbon of $R^2$.

4. A polymer according to claim 3 wherein $R^1$ is hydrogen and each of $R^7$ and $R^8$ is methyl.

5. A polymer according to claim 3 wherein $m$ is 2.

6. A polymer according to claim 5 wherein $R^1$ is hydrogen and each of $R^7$ and $R^8$ is methyl.

7. A polymer according to claim 1 which is an interpolymer with at least one polymerizable unsaturated monomer.

8. A polymer according to claim 2 which is an interpolymer with at least one polymerizable unsaturated monomer.

9. A polymer according to claim 3 which is an interpolymer with at least one polymerizable unsaturated monomer.

10. A polymer according to claim 4 which is an interpolymer with at least one polymerizable unsaturated monomer.

11. A polymer according to claim 5 which is an interpolymer with at least one polymerizable unsaturated monomer.

12. A polymer according to claim 6 which is an interpolymer with at least one polymerizable unsaturated monomer.

* * * * *